(12) United States Patent
Cutchin

(10) Patent No.: US 10,061,189 B2
(45) Date of Patent: Aug. 28, 2018

(54) STEREO-PANORAMIC DATA

(75) Inventor: Steve Cutchin, Thuwal (SA)

(73) Assignee: KING ABDULLAH UNIVERSITY OF SCIENCE AND TECHNOLOGY (KAUST), Thuwal (SA)

( * ) Notice: Subject to any disclaimer, the term of this patent is extended or adjusted under 35 U.S.C. 154(b) by 1234 days.

(21) Appl. No.: 13/604,077

(22) Filed: Sep. 5, 2012

(65) Prior Publication Data

US 2013/0057643 A1 Mar. 7, 2013

Related U.S. Application Data

(60) Provisional application No. 61/531,555, filed on Sep. 6, 2011.

(51) Int. Cl.
*G03B 37/02* (2006.01)
*G03B 35/08* (2006.01)
*H04N 13/02* (2006.01)

(52) U.S. Cl.
CPC ............ *G03B 37/02* (2013.01); *G03B 35/08* (2013.01); *H04N 13/0221* (2013.01)

(58) Field of Classification Search
CPC .................................................. H04N 5/23238
USPC ................................................ 348/36; 702/2
See application file for complete search history.

(56) References Cited

U.S. PATENT DOCUMENTS

| 5,794,348 A | 8/1998 | Scott |
| 2006/0290779 A1 | 12/2006 | Reverie et al. |
| 2006/0293786 A1 | 12/2006 | Baba et al. |
| 2008/0027591 A1* | 1/2008 | Lenser ................. G05D 1/0251 701/2 |
| 2008/0316301 A1 | 12/2008 | Givon |
| 2011/0044531 A1 | 2/2011 | Zhang et al. |

FOREIGN PATENT DOCUMENTS

WO 2008048707 12/2012

OTHER PUBLICATIONS

International Search Report and Written Opinion in PCT/US2012/053862 dated Nov. 23, 2012.

* cited by examiner

*Primary Examiner* — Jefferey F Harold
*Assistant Examiner* — Sihar Karwan
(74) *Attorney, Agent, or Firm* — Patent Portfolio Builders PLLC

(57) ABSTRACT

Systems and methods for automatically generating three-dimensional panoramic images for use in various virtual reality settings are disclosed. One embodiment of the system includes a stereo camera capture device (SCD), a programmable camera controller (PCC) that rotates, orients, and controls the SCD, a robotic maneuvering platform (RMP), and a path and adaptation controller (PAC). In that embodiment, the PAC determines the movement of the system based on an original desired path and input gathered from the SCD during an image capture process.

20 Claims, 4 Drawing Sheets

STEREO-PANORAMIC DATA

CROSS REFERENCE TO RELATED APPLICATIONS

This application claims the benefit of U.S. provisional patent application Ser. No. 61/531,555, filed on Sep. 6, 2011, having the title "System and Method for Generating Three-Dimensional Panoramic Images," by Cutchin, which is incorporated herein by reference as if expressly set forth in its entirety.

This application also incorporates by reference the following, as if expressly set forth in their entireties:

(a) PCT Application WO97/22918 A1 ("PCT Application"); and (b) U.S. Pat. No. 7,884,848 B2, having the title "Viewing Environment and Recording System," by Ginther ("Ginther Patent").

BACKGROUND

Field of the Disclosure

The present disclosure relates generally to data processing and, more particularly, to processing three-dimensional stereoscopic data.

Description of Related Art

Virtual reconstruction of three-dimensional (3D) environments generally includes three basic steps. First, there should be a physical capture of real-world data from an environment that will eventually be virtually recreated. Second, there is usually a conversion of the captured real-world data into a geometric computer model for computer interaction. And, last, there is a refinement of the computer model for both accuracy and performance. Given the increased popularity of 3D environments, there are efforts to improve virtual reconstruction of 3D environments.

SUMMARY

The present disclosure provides systems and methods relating to stereo-panoramic data.

Briefly described, in architecture, one embodiment of the system comprises a stereo camera capture device (SCD) and a programmable camera controller (PCC), both of which reside on a robotic maneuvering platform (RMP). The RMP, PCC, and SCD are controlled by a path and adaptation controller (PAC). In an embodiment, the path and adaptation controller (PAC) can reside either on the RMP or remotely.

One embodiment of the method comprises determining a stereocomplexity (Sc) of stereoscopic panoramic data, determining a data-capture location based on the determined Sc, and instructing a robotic maneuvering platform (RMP) to move to the determined data-capture location.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Virtual reconstruction of three-dimensional environments play a role in a wide variety of applications including, but not limited to, creation of combat and pilot simulator environments, video games, motion pictures, and urban design. At its core, virtual reconstruction relies upon three basic steps. First, data from a real-world environment is physically captured. To capture real-world environment data, conventional three-dimensional (3D) imaging systems utilize photogrammetric techniques as well as Light Detection and Ranging (LIDAR) laser-based scanning and other traditional survey methods. Next, the captured data is converted into a geometric computer model to allow for computer interfacing. And, thereafter, the geometric computer model is refined based on the constraints of the end application, in which the computer model is adjusted for accuracy and performance characteristics.

To date, photogrammetric techniques have not been particularly effective in multiple fronts, with LIDAR-based methods providing more realistic models, often with millimeter-level resolution. Even in systems employing LIDAR, however, the resulting models lack photo-realistic qualities that are desirable for many applications. Additionally, LIDAR systems remain cost prohibitive in many settings.

Furthermore, in conventional systems, stereo-panoramic images are not accessible until after the captured data is processed through a stitching pipeline. Hence, the stereo-panoramic images are not computable until after image capture has occurred. In other words, computation is a process which is deferred until all sets of panoramic images at all locations in the large area have been taken. As such, traversal of a desired path within an environment cannot be dynamically adjusted during the path traversal.

Given these shortcomings, a need exists for a cost-effective and efficient 3D panoramic image generating system, which allows for the creation of high quality virtual environments.

The various embodiments disclosed herein address the shortcomings of currently-available systems by approaches to capturing 3D panoramic images or video (collectively, data). Some embodiments include systems and processes that allow for dynamic adjustment during data capture, thereby allowing for more accurate and efficient processing of 3D environments. Thus, unlike conventional approaches, which typically require scanning of the entire 3D environment prior to data processing, the disclosed embodiments permit data processing at each incremental step. And, the resulting processed data is used to determine the optimal location from which to capture the next set of stereoscopic panoramic data.

Figure 1:
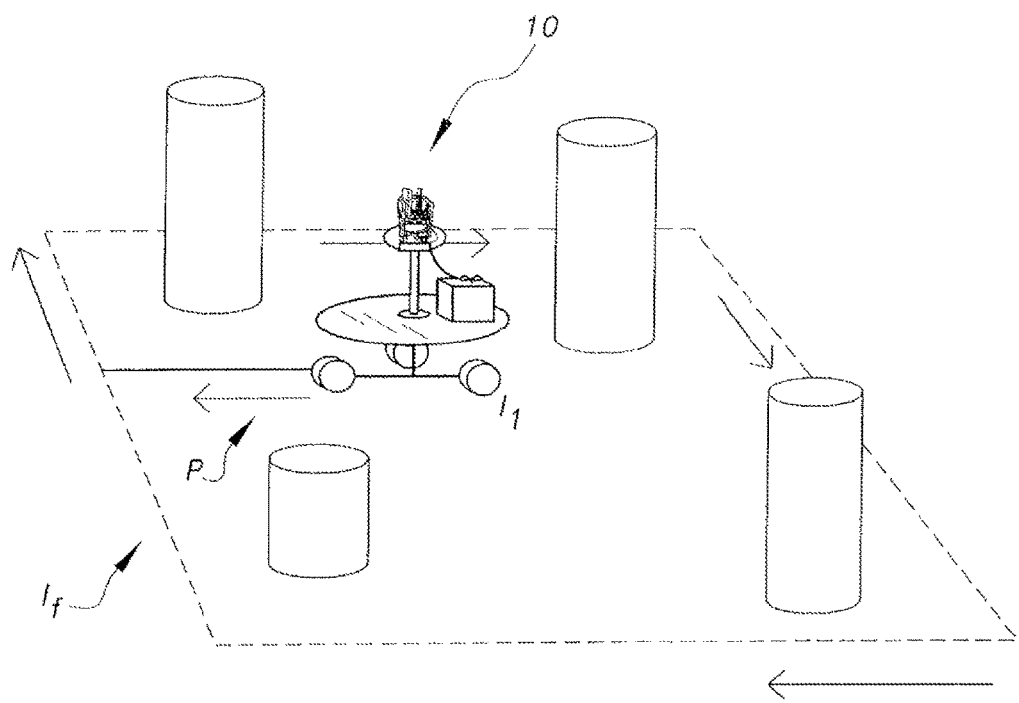
FIG. 1 shows one embodiment of an environment from which three-dimensional (3D) panoramic data may be gathered.

FIG. 1 shows one embodiment of an environment from which three-dimensional (3D) panoramic data may be gathered. As shown in FIG. 1, a mobile system 10 begins at a starting location $l_1$, such as the center of a wall or the center of a selected area. The mobile system 10 progresses through a programmed desired path P, gathering stereoscopic panoramic data as it progresses through the path. Eventually, the mobile system 10 reaches its final location $l_f$.

Figure 2:
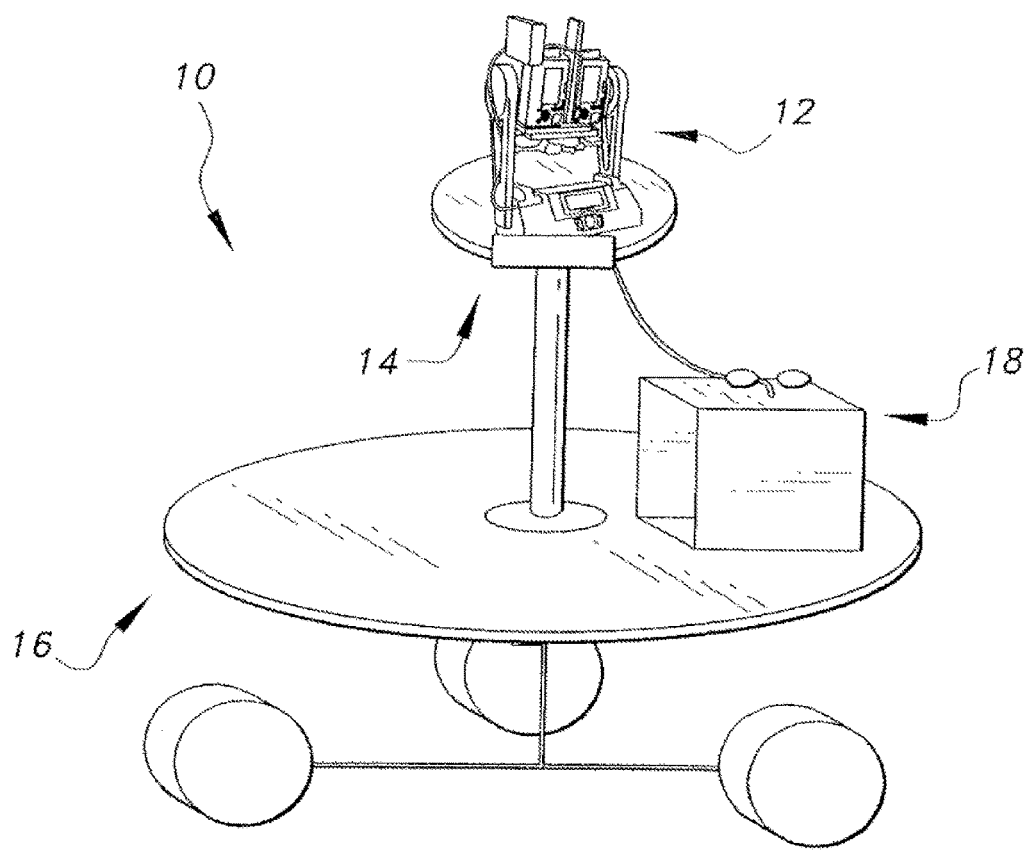
FIG. 2 shows one embodiment of a system for gathering 3D panoramic data.

With the environment of FIG. 1 in mind, FIG. 2 shows one embodiment of a mobile system 10 for gathering 3D panoramic stereoscopic data. As shown in FIG. 2, one embodiment of the mobile system 10 comprises a robotic maneuvering platform (RMP) 16 that moves the mobile system 10 through the specified environment. The mobile system 10 also comprises a stereo camera capture device (SCD) 12, which is mounted on the RMP 16 and which captures the stereoscopic panoramic data. The mobile system 10 further comprises a programmable camera controller (PCC) 14, which is mounted on the RMP 16 and which controls movement of the SCD 12. Additionally, the mobile system 10 comprises a path and adaptation controller (PAC) 18 that controls the RMP 16, the PCC 14, and the SCD 12.

To the extent that the SCD 12 captures the stereoscopic panoramic data in a particular environment, the SCD 12 is selected to best fit the environment of interest. As such, the SCD 12 can be any suitable type of stereoscopic camera or other image capture device. In a preferred embodiment, the SCD 12 comprises dual programmable digital cameras arranged on a common mount so that one camera produces a "left" eye digital image and the other camera produces a "right eye" digital image that, when combined, produce a 3D effect common to stereoscopic cameras. It is also possible to use a conventional stereoscopic camera that produces a single image, but this adds a layer of complexity when eventually computing stereo complexity (Sc) of an acquired data set. The SCD 12 is selected to afford, among other things, a desired individual snapshot resolution, a desired number of snapshots necessary to cover a panorama, a desired speed of scene collection, and desired lenses usable in the image capture. To the extent that conventional stereoscopic cameras are known in the art, only a truncated discussion of stereoscopic cameras is provided herein.

The PCC 14 controls rotation, orientation, and other directional movement of the SCD 12. In the environment of FIG. 1, the PCC 14 controls the directionality of the SCD 12 as it collects data from a particular location within the designated path. Thus, the PCC 14 can be any suitable type of programmable camera controller or image capture controller, such as the GigaPan® EPIC robotic camera mount, manufactured by Gigapix Systems, LLC. The PCC 14 controls, among other things, rotation and tilt of the SCD 12 to obtain a desired 360° set of panoramic images at each desired location, as well as orientation of any camera (or cameras) that form a part of the SCD 12. Additionally, the PCC 14 controls timing of image capture and standard photography parameters for the SCD 12 at a particular location. In one embodiment, the dual digital cameras are mounted for rotation about a vertical axis that extends substantially midway between two cameras. For other embodiments, other mounting positions, such as where a stereoscopic camera is mounted for rotation about a horizontal axis or any other axis, may be used. To the extent that conventional programmable camera controllers are known in the art, for example in the PCT Application, only a truncated discussion of an example controller is provided herein.

The RMP 16 controls the movement of the mobile system 10 through the environment. Thus, in one preferred embodiment, the RMP 16 provides a completely computerized control of speed, direction, height, and orientation of the PCC 14, and also the SCD 12 mounted on the PCC 14. While FIG. 2 shows the RMP 16 as being a wheeled platform, the RMP 16 can be any type of mobile controllable platform, such as a computerized track, wheeled platform, submarine, blimp, radio controlled (RC) helicopter, or any similar apparatus. Since maneuvering platforms, such as that shown in the Ginther Patent, are known in the art, only a truncated discussion of the RMP 16 is provided herein.

The PAC 18 adjusts the path and direction of the RMP 16 based on measured stereo complexity (Sc) of a particular environment being captured. To do so, the PAC 18 is initially programmed with a desired path through a large area. Depending on the environment that is to be captured, the desired path may be linear, spiral, rectangular grid, rectangular sweep, or whatever geometric pattern is deemed most suitable to the particular area of interest. In short, the desired path determines the direction of travel of the RMP 16. Although FIG. 2 shows the PAC 18 being mounted on the RMP 16, it will be understood by those having skill in the art that the PAC 18 may be placed at a remote location and may communicate with the RMP 16, the PCC 14, and SCD 12 by wireless techniques, if desired. Since remote wireless techniques are known in the art, only a truncated discussion of such wireless techniques is provided herein. Suffice it to say that the speed, direction, start, stop and any other movements of the system 10, based on an original path chosen and input gathered from the SCD 12 during image capture, is determined and controlled by the PAC 18.

Figure 3:
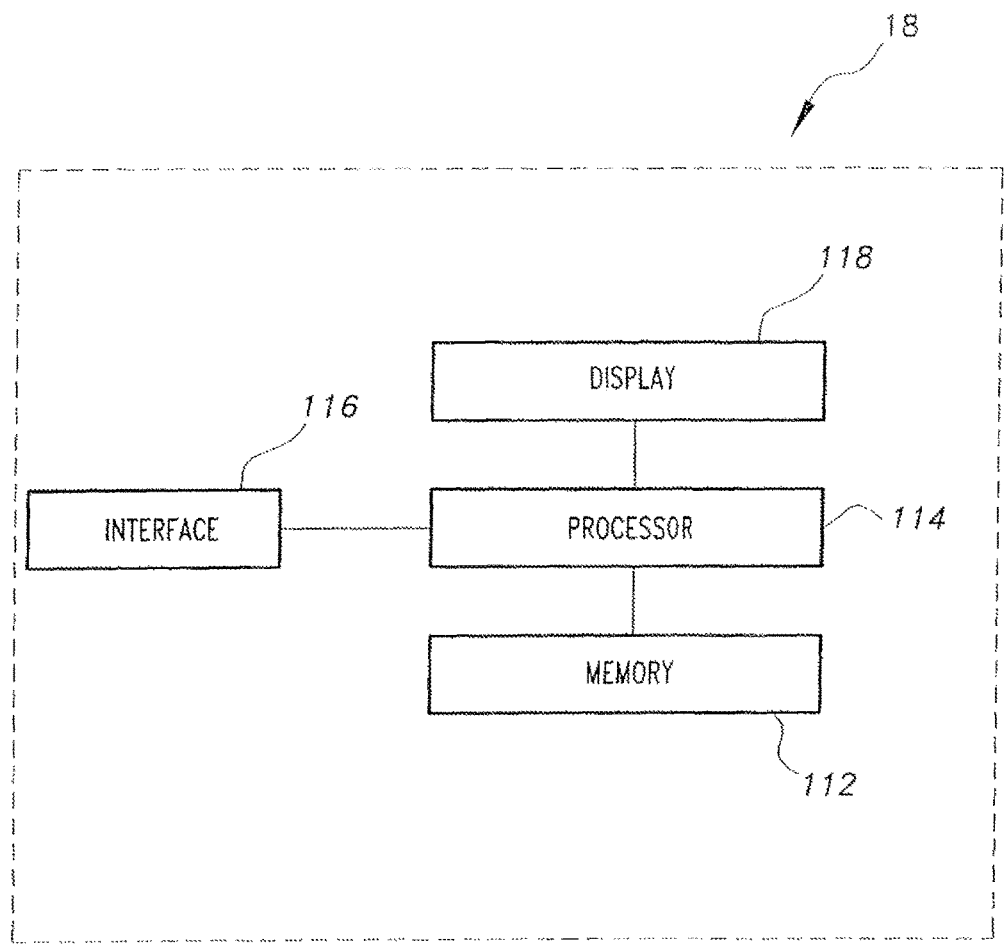
FIG. 3 shows several components in one embodiment of a path and adaption controller (PAC) in the system of FIG. 2.

FIG. 3 shows one embodiment of several components in the PAC 18 of FIG. 2. The PAC 18 can be any suitable type of controller or computer for performing the calculations, as described below. Thus, as shown in FIG. 3, the PAC 18 comprises a memory 112, a processor 114, a display 118, and an interface 116. Path data (which represents the desired path) is entered into the PAC 18 via any suitable type of user interface 116, and is stored in memory 112, which can be any suitable type of computer readable and programmable memory. The processor 114, which can be any suitable type of computer processor, performs calculations as the mobile system 10 progresses through the desired path. The display 118 allows a user to view the path data or other information that may be relevant to the mobile system 10. As such, the display 118 can be any type of conventional display system.

Figure 4:
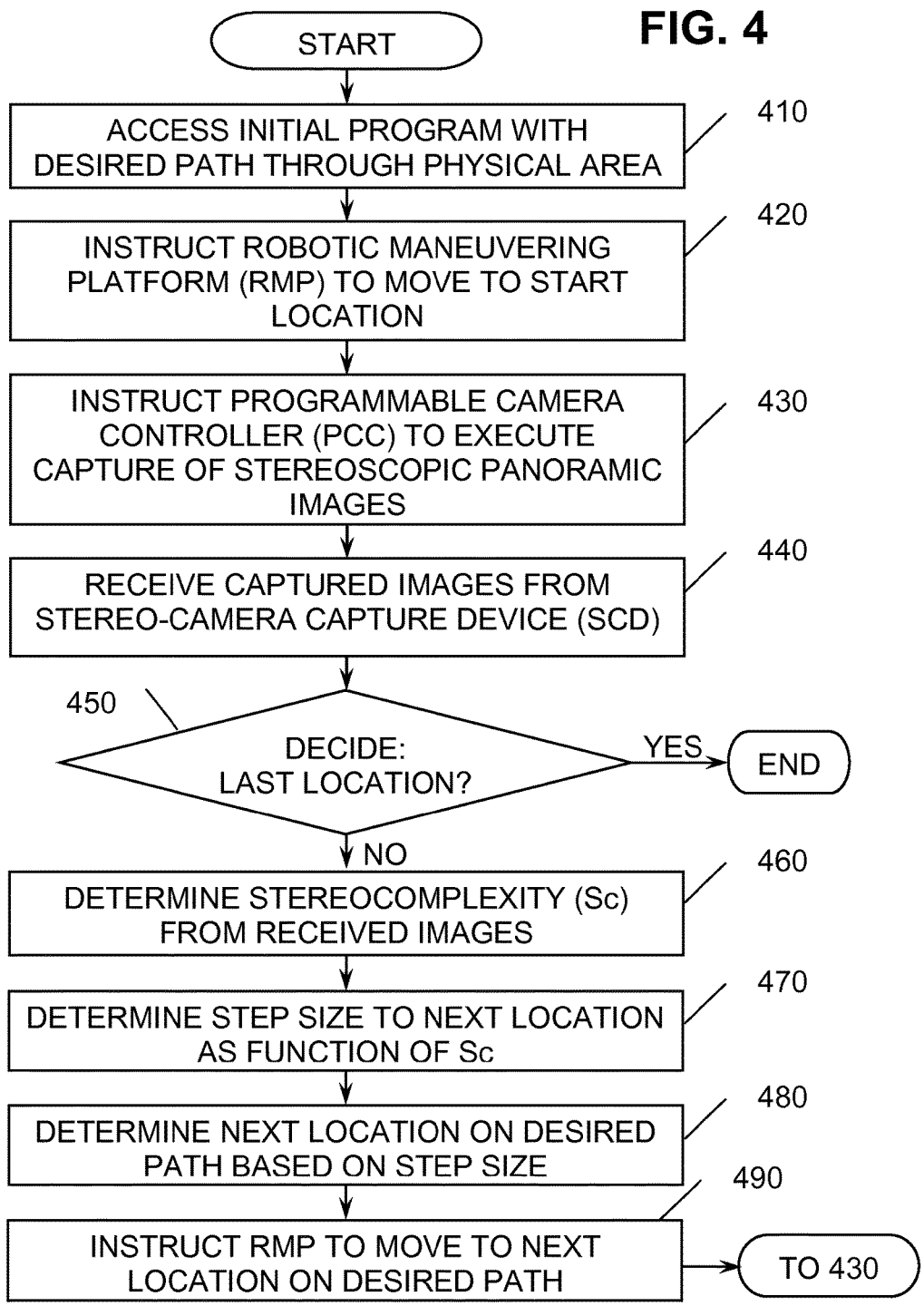
FIG. 4 is a flowchart showing one embodiment of processing steps performed by the PAC of FIG. 3.

With the system of FIGS. 1 through 3 in mind, FIG. 4 shows a flowchart in one embodiment of a process, as performed by the PAC 18 of FIG. 3. Initially, a desired path is programmed into the PAC 18. For example, the initial path may traverse a width of a room and at a minimal step size. Furthermore, capture resolution and exposure options are programmed into the PCC 14. Equipped with the programmed desired path, the operation of the PAC 18 progresses as follows.

First, the PAC 18 accesses 410 the initial program with the desired path through the physical area. Next, the PAC 18 instructs 920 the RMP 16 to move to the start location, as designated in the initial program. Once the RMP 16 reaches the initial location, the PAC 18 instructs 430 the PCC 14 to execute capture of stereoscopic panoramic data at that initial location. This instruction 430 causes the SCD 12 to capture the 3D stereoscopic panoramic data at that initial location. For example, the SCD 12 shoots a 360° panorama at the initial location. In one embodiment, the number of photographic images, and thus stereo pairs, may be set as desired, with sixteen being a preferred number. Other numbers of stereo pairs may be used, however. For example, in the embodiment of FIG. 4, only six primary axis pairs of stereo images are used to determine the Sc. The six primary axis pairs correspond to a basic cubic model comprising front view, rear view, left view, right view, top view and bottom view. However, as noted above, any number of stereo pairs may be used to improve accuracy in capturing the 3D environment.

Once the SCD 12 captures the data, that data is received 440 by the PAC 18 and the PAC 18 decides 450 whether the entire desired path has been traversed. In other words, the PAC 18 receives 440 data and decides 450 whether data from the last location on the path has been gathered. If the path has been traversed in its entirety, then the process ends. However, if the PAC 18 decides that there still exist additional locations along the desired path, then the PAC 18 proceeds to determine 460 a stereo-complexity (Sc) associated with the recently-captured data. The Sc represents the degree to which the left eye image differs from the right eye image in a stereo pair based on per pixel intensity difference. This provides a quantitative estimate of how many pixels exist at different distances from the camera. Pairs of stereo images with a high Sc value contain images of objects at a variety of different distances from the camera. Pairs of stereo images with low Sc value contain images of objects at a generally fixed distance from the camera. Scenes with a variety of objects at different distances from the camera are more complex. Scenes with a variety of objects at a fixed distance from the camera are simpler. To the extent that one skilled in the art will understand how Sc correlates to the number, variety, and distance of objects within a camera's field-of-view, further discussion of Sc is omitted in this disclosure.

In determining 460 the Sc, the SCD 12 provides a copy of the images to the PAC 18. In one embodiment, the PAC 18 examines pairs of stereoscopic images and determines the Sc of the location. In a preferred embodiment, the algorithm for computing the Sc of a location uses a L1 Norm of a computed stereo-differential between all stereo pairs captured at a particular location. This stereo complexity is then normalized to a physical world distance along the desired path to be traveled and thereafter checked against an interocular distance of a stereo pair. It should be appreciated that, in other embodiments, other mathematical norms, such as L2 or L∞, can be used instead of the L1 Norm. To the extent that L1, L2, and L∞ are known in the art, only a truncated discussion of these norms are provided herein.

In some embodiments, to compute the Sc, one computes the difference between the left and right eye panoramic images, and then computes the L1 Norm of a serialized form of the different images. As noted above, in conventional systems, the stereo panoramic images are not accessible until after the captured data is processed through a stitching pipeline. Hence, the stereo panoramic images are not computable until after image capture has occurred. In other words the computation is a process which is deferred until all sets of panoramic images at all locations in the large area have been taken. In the embodiment of FIG. 4, this shortcoming is overcome by noting that the difference between the panoramic images is sufficiently similar to the difference between the combined collected stereo pairs (excluding non-overlapping image components). This results in a simplified algorithm that can compute an approximate stereo differential at image capture time, thereby circumventing the need to wait for data processing through the stitching pipeline.

In removing the overlapping image components, it should be noted that, in general, a stereo overlap for a given SCD 12 is fixed, and is a function of the camera lenses and sensors that may be furnished as part of the technical specifications of the dual camera pair. Therefore, an area of overlap between a left camera (left eye) image and a right camera (right eye) image can be programmed into the PAC 18. This is the left eye stereo overlap. Similarly, an area of overlap between the right camera and the left camera can likewise be programmed into the PAC 18. This is the right eye stereo overlap. A copy of the stereo pairs taken at a given location is furnished to the PAC 18 by the SCD 12, and the PAC 18 can then filter out non-overlapping areas of the images to obtain a patch of pixels for the left eye stereo overlap component and another patch of pixels for the right eye stereo overlap component of each stereo pair. Viewing the right eye and the left eye pixel patches as matrices, a left eye matrix Norm and a right eye matrix Norm can be compared. The left eye matrix or right eye matrix Norm can be the L1, L2, L∞, or other known properties.

In the embodiment of FIG. 4, if the pixels in a matrix are denoted by $\alpha_{xy}$, the norm of the left eye matrix is denoted by $j_l$, and the norm of the right eye matrix is denoted by $j_r$, then the L1 Norm of the left eye matrix is represented as:

$$j_l = \|\alpha_l\|_1 = \max_y \Sigma_{y-1}^n |\alpha_{xy}| \quad \text{[Eq. 1]},$$

which represents the largest absolute column sum. Similarly, the L1 Norm of the right eye matrix is represented as:

$$j_r = \|\alpha_r\|_1 = \max_y \Sigma_{y-1}^n |\alpha_{xy}| \quad \text{[Eq. 2]}.$$

The L∞ Norm of the left eye matrix is defined as:

$$j_l = \|\alpha_l\|_\infty = \max_x \Sigma_{x-1}^n |\alpha_{xy}| \quad \text{[Eq. 3]},$$

which represents the largest absolute row sum. Similarly, the L∞ Norm of the right eye matrix is defined as:

$$j_r = \|\alpha_r\|_\infty = \max_x \Sigma_{x-1}^n |\alpha_{xy}| \quad \text{[Eq. 4]}.$$

The L2 Norm of a matrix is the largest latent root of the matrix.

Defining Sct as:

$$Sct = \text{abs}(j_r - j_l) \quad \text{[Eq. 5]},$$

for a location i, stereo pair j, and k pairs of stereo images at the location i, the Sc is initialized to −∞, and for each stereo pair j in k, Sc is calculated at each successive iteration as being:

$$Sc = \max(Sct, Sc) \quad \text{[Eq. 6]}.$$

Continuing with the embodiment of FIG. 4, upon determining 460 Sc, the PAC 18 next determines 470 a step size to advance the RMP 16 in the desired path. In short, the step size is the distance between data capturing locations. The step size is determined 470 as a function of the Sc. Thus, for some embodiments, at each location i, the PAC 18 computes a normalized distance factor d, which is based on the interocular distance, the distance of the entire desired path, and a focal distance (focal length). The PAC 18 then computes the step size as:

$$\text{Step Size} = (1/Sc)(d) \quad \text{[Eq. 7]}.$$

In the embodiment of FIG. 4, the step size is inversely proportional to the Sc of the current location. In other words, the greater the Sc of the current location, the shorter the step size in moving to the next location. In this manner, the mobile system 10 captures the greatest amount of detail possible to accurately represent the most complex locations in the large area, which in turn allows for an accurate and realistic panoramic modeling not realized by currently available systems.

Once the step size is determined 470, the PAC 18 determines 480 the next location along the path, which is a step-size increment along the desired path, and instructs 490 the RMP 16 to move to that next location, where the PAC 18 instructs 430 the PCC 14 and SCD 12 to capture the next set of stereo-panoramic data. These steps are repeated until the mobile system 10 traverses the entire desired path, and collects all of the stereo-panoramic data from each location along the desired path.

Once all of the data has been collected along the desired path, conversion of the captured data into a geometric computer model is performed by a computer system that is preferably external to the mobile system 10. In other words, in the preferred embodiment, the PAC 18 is not used to generate a geometric computer model. Instead, the geometric computer model is generated by another computer system peripheral to the mobile system 10. The external computer may use any conventional geometric modeling software, such as GigaPan® Stitch. In such an arrangement, the captured images are saved to the external computer, and copies of the images are transmitted to the PAC 18 for the computation of step size. While the intermediate stereo-panoramic data is processed to determine the step size, the final processing of the panoramic data is deferred until completion of all stereo-panoramic data from all of the locations along the path are captured. Although panoramic generation at capture time is possible, it should be understood that this would add a layer of complexity to the calculations, which are preferably not needed for the determination of the data-acquisition locations along the desired path.

As one can see from the embodiments of FIGS. 1 through 4, the disclosed mobile system 10 allows for dynamic alterations in data capture for 3D environments, thereby allowing for greater accuracy in representing the particular 3D environment for which the data is collected.

The processor 114 may be implemented in hardware, software, firmware, or a combination thereof. In the preferred embodiment(s), the processor 114 is implemented in hardware using any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In an alternative embodiment, the processor 114 is implemented in software or firmware that is stored in a memory and that is executed by a suitable instruction execution system.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The process of FIG. 4, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A method, comprising the steps of:
   (a) accessing a program having a desired path through a physical area;
   (b) instructing a robotic maneuvering platform (RMP) to move to a start location on the desired path;
   (c) instructing a programmable camera controller (PCC) to execute capture of stereoscopic panoramic data at the start location;
   (d) receiving stereoscopic panoramic data from the start location;
   (e) deciding whether additional data-capture locations along the desired path exist; and
   (f) responsive to deciding that additional data-capture locations exist along the desired path:
   (f1) determining a stereocomplexity (Sc) from the received stereoscopic panoramic data, the Sc being based at least in part upon a norm of a stereo-differential between stereo pairs of the stereoscopic panoramic data;
   (f2) determining a step size to a subsequent location on the desired path, the step size being a function of the determined Sc;
   (f3) determining the subsequent location on the desired path based on the determined step size;
   (f4) instructing the RMP to move to the determined subsequent location on the desired path;
   (f5) instructing the PCC to execute capture of stereoscopic panoramic data at the subsequent location;
   (f6) receiving stereoscopic panoramic data from the subsequent location; and
   (f7) repeating the process from step (e).

2. A method, comprising:
  determining a stereocomplexity (Sc) of stereoscopic panoramic data, wherein the Sc is based at least in part upon a norm of a stereo-differential between stereo pairs of the stereoscopic panoramic data;
  determining a step size based on the Sc;
  determining a data-capture location on a desired path based on the determined Sc, wherein in the data-capture location is determined based on the step size; and
  instructing a robotic maneuvering platform (RMP) to move to the data-capture location.

3. The method of claim 2, the step of instructing the RMP to move to the data-capture location comprising:
  instructing the RMP to move to a subsequent data capture location along the desired path in an increment that is equal to the step size.

4. The method of claim 2, the step of determining the Sc comprising:
  comparing left-camera data of the stereoscopic panoramic data with right-camera data of the stereoscopic panoramic data;
  determining non-overlapping data components between the left-camera data of the stereoscopic panoramic data and the right-camera data of the stereoscopic panoramic data; and
  filtering the non-overlapping data components.

5. The method of claim 4, the step of determining the Sc further comprising:
  comparing a left-eye matrix norm and a right-eye matrix norm as a function of the filtered non-overlapping data components.

6. The method of claim 2, the step of determining the Sc comprising:

computing $j_l = \|\alpha_l\|_1 = \max_y \Sigma_{y=1}^n |\alpha_{xy}|$;

computing $j_r = \|\alpha_r\|_1 = \max_y \Sigma_{y=1}^n |\alpha_{xy}|$;

computing $j_l = \|\alpha_l\|_\infty = \max_x \Sigma_{x=1}^n |\alpha_{xy}|$; and computing $j_r = \|\alpha_r\|_\infty = \max_x \Sigma_{x=1}^n |\alpha_{xy}|$, wherein:
  $\alpha xy$ denotes pixels in a matrix;
  $j_l$ denotes a norm of a left eye matrix;
  $j_r$ denotes a norm of a right eye matrix
  i denotes a location;
  j denotes a stereo pair; and
  k denotes a number of pairs of stereo images at location i.

7. The method of claim 6, the step of determining the Sc further comprising:

computing $Sc = \max(Sct, Sc)$, wherein $Sct = abs(j_r - j_l)$.

8. The method of claim 7, the step of determining the step size further comprising:
  computing:
    Step Size = $(1/Sc)(d)$,
  wherein d denotes a normalized distance factor.

9. The method of claim 8, the normalized distance factor (c) being based on an interocular distance, the d further being based on a distance of an entire desired path, the d further being based on a focal distance.

10. The method of claim 2, further comprising:
  receiving the stereoscopic panoramic data.

11. The method of claim 10, the step of determining the Sc comprising:
  determining the Sc from the received stereoscopic panoramic data.

12. The method of claim 2, further comprising producing a plurality of stereo-panoramic images at the data-capture location.

13. The method of claim 6, further comprising producing a plurality of stereo-panoramic images.

14. The method of claim 7, further comprising producing a plurality of stereo-panoramic.

15. The method of claim 8, further comprising producing a plurality of stereo-panoramic.

16. The method of claim 3, comprising:
  instructing a programmable camera controller (PCC) to execute capture of stereoscopic panoramic data at the subsequent location.

17. The method of claim 16, comprising:
  receiving stereoscopic panoramic data from the subsequent location.

18. The method of claim 17, comprising:
  accessing a program having the desired path through a physical area;
  instructing the robotic maneuvering platform (RMP) to move to a start location on the desired path;
  instructing the programmable camera controller (PCC) to execute capture of stereoscopic panoramic data at the start location;
  receiving the stereoscopic panoramic data from the start location;
  deciding whether additional data-capture locations along the desired path exist; and
  responsive to deciding that the additional data-capture locations exist along the desired path:
    determining the stereocomplexity (Sc) from the received stereoscopic panoramic data.

19. The method of claim 4, wherein the left-camera data of the stereoscopic panoramic data and the right-camera data of the stereoscopic panoramic data is captured via dual programmable digital cameras physically arranged on a common mount.

20. The method of claim 19, wherein the common mount facilitates a rotation about a vertical axis that extends midway between the dual programmable digital cameras.

* * * * *